Patented Sept. 5, 1939

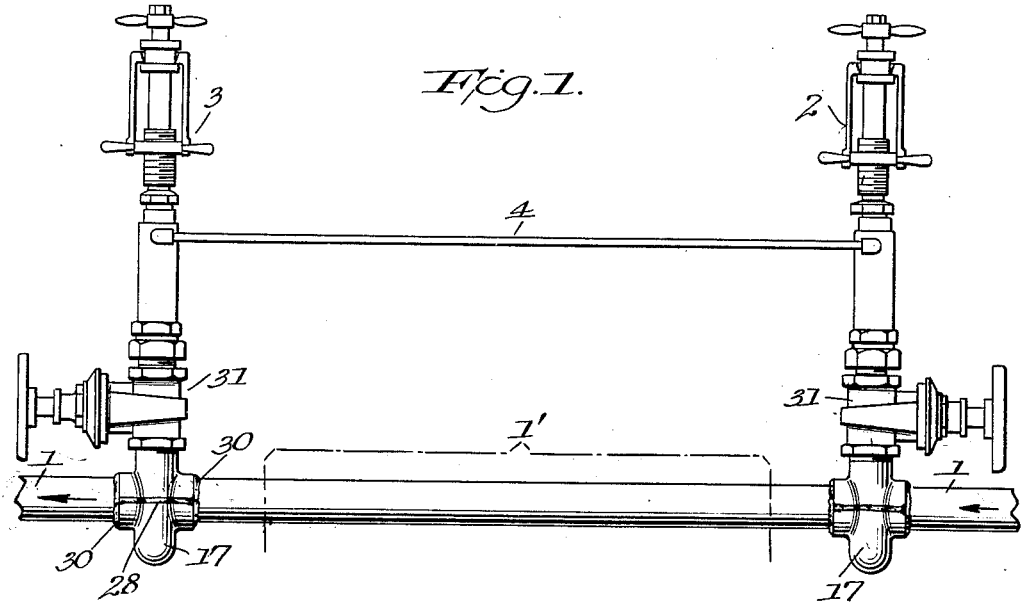
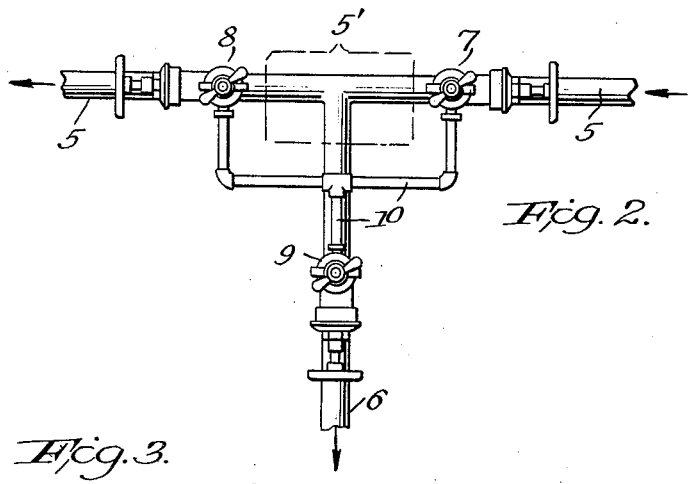
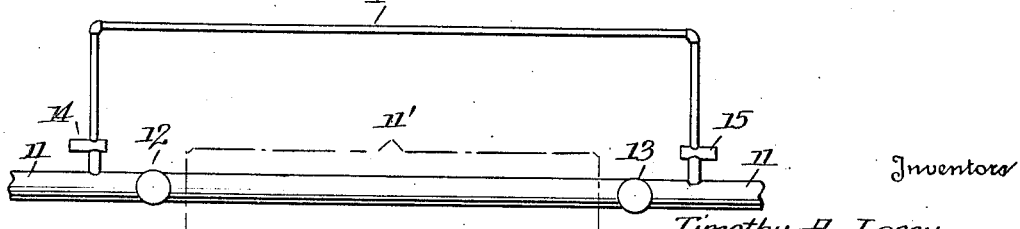

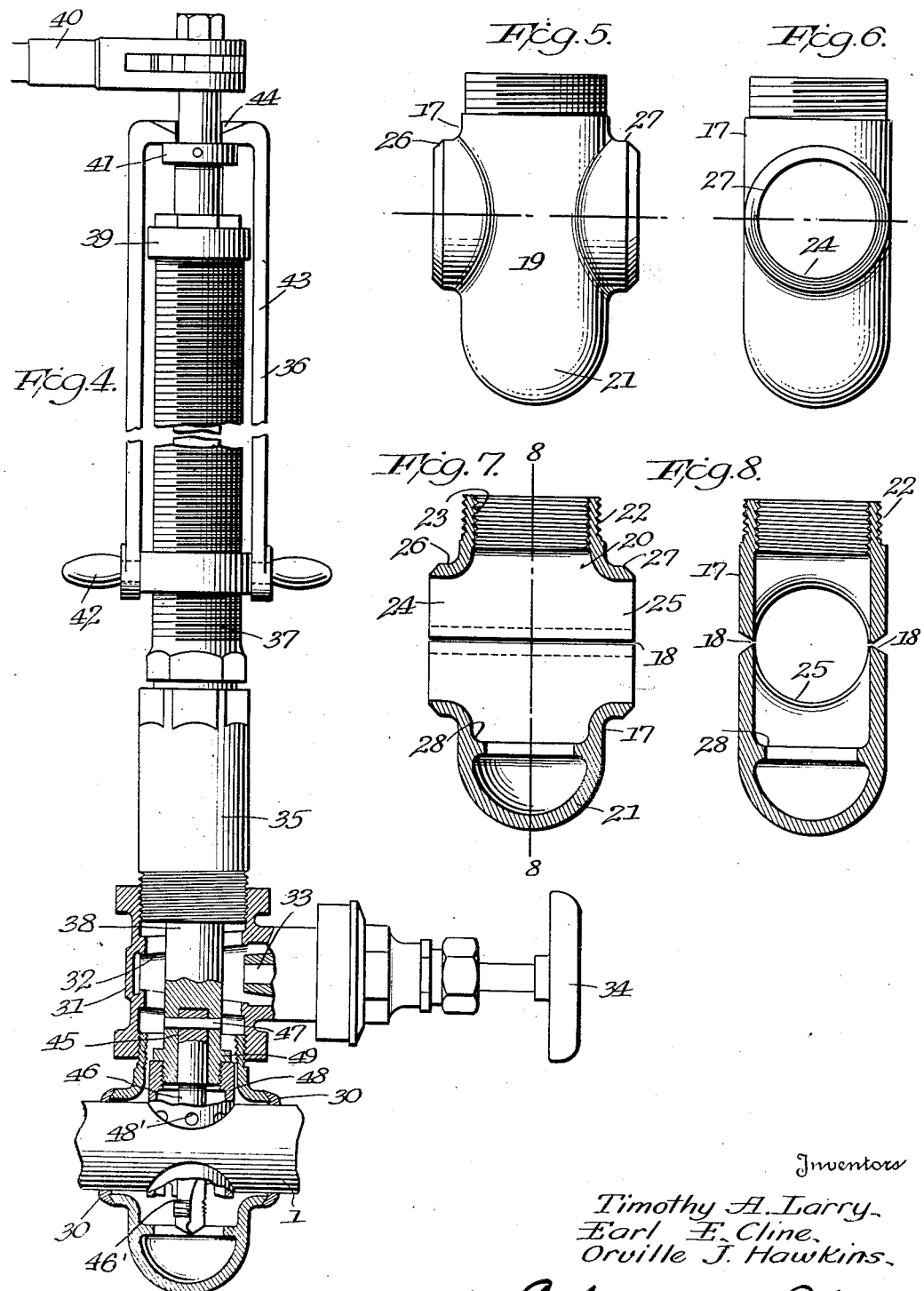

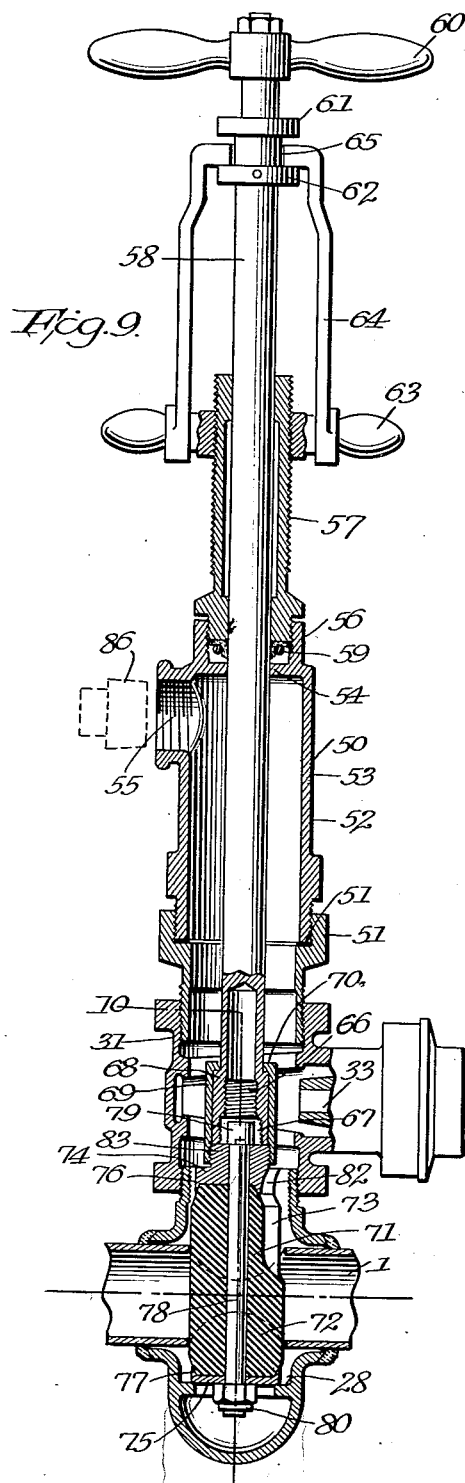

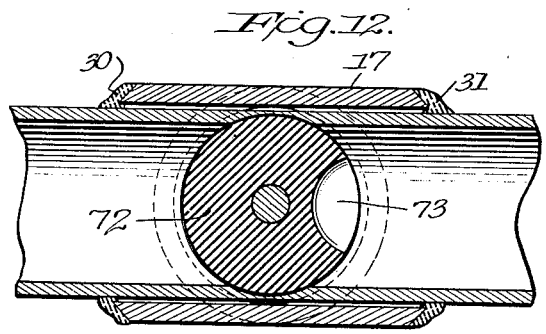
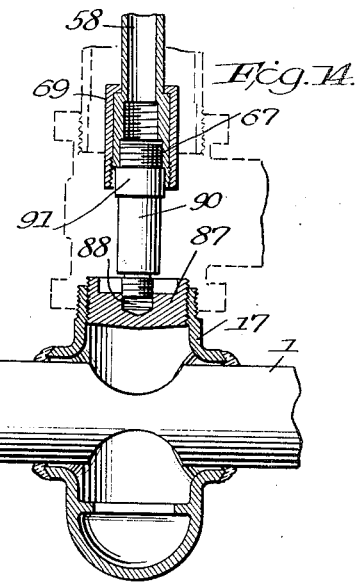
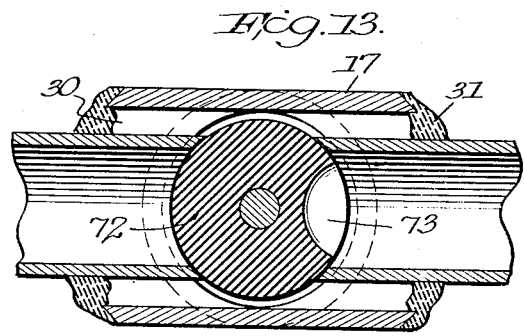
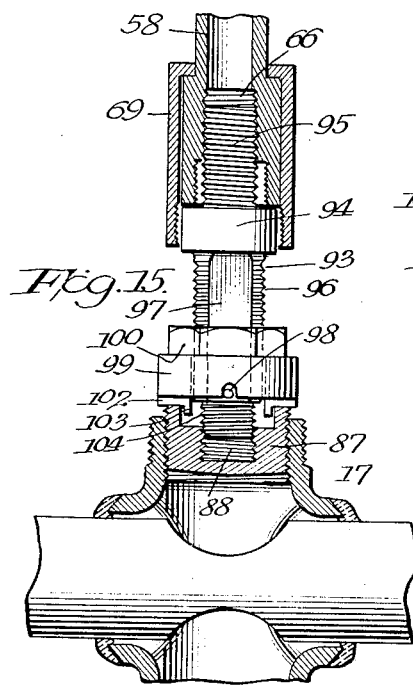
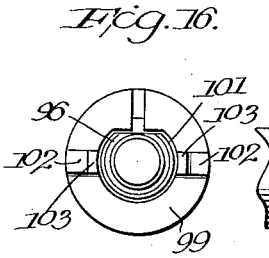
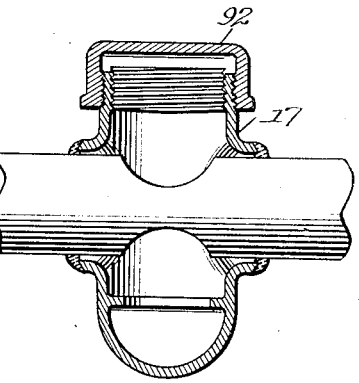

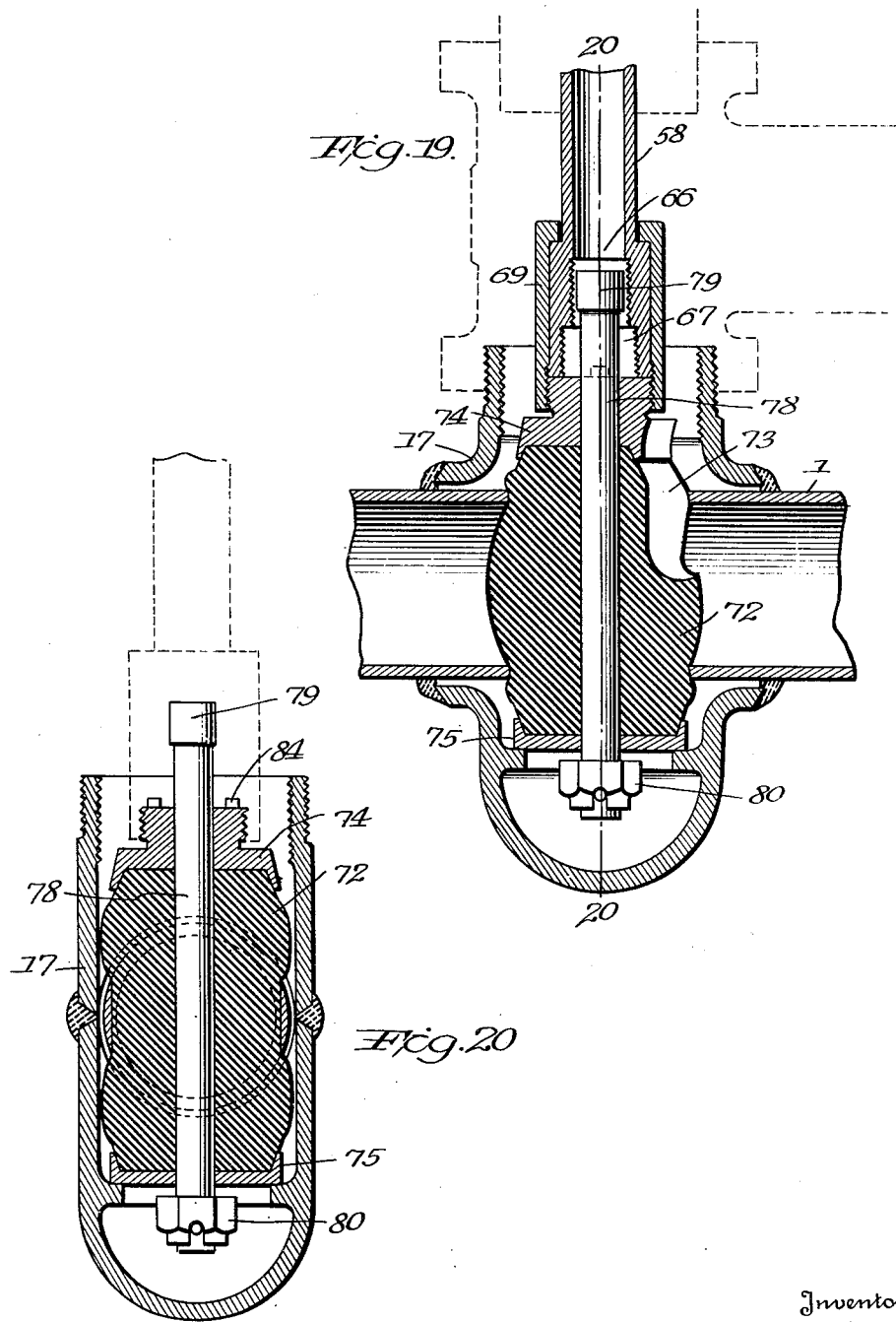

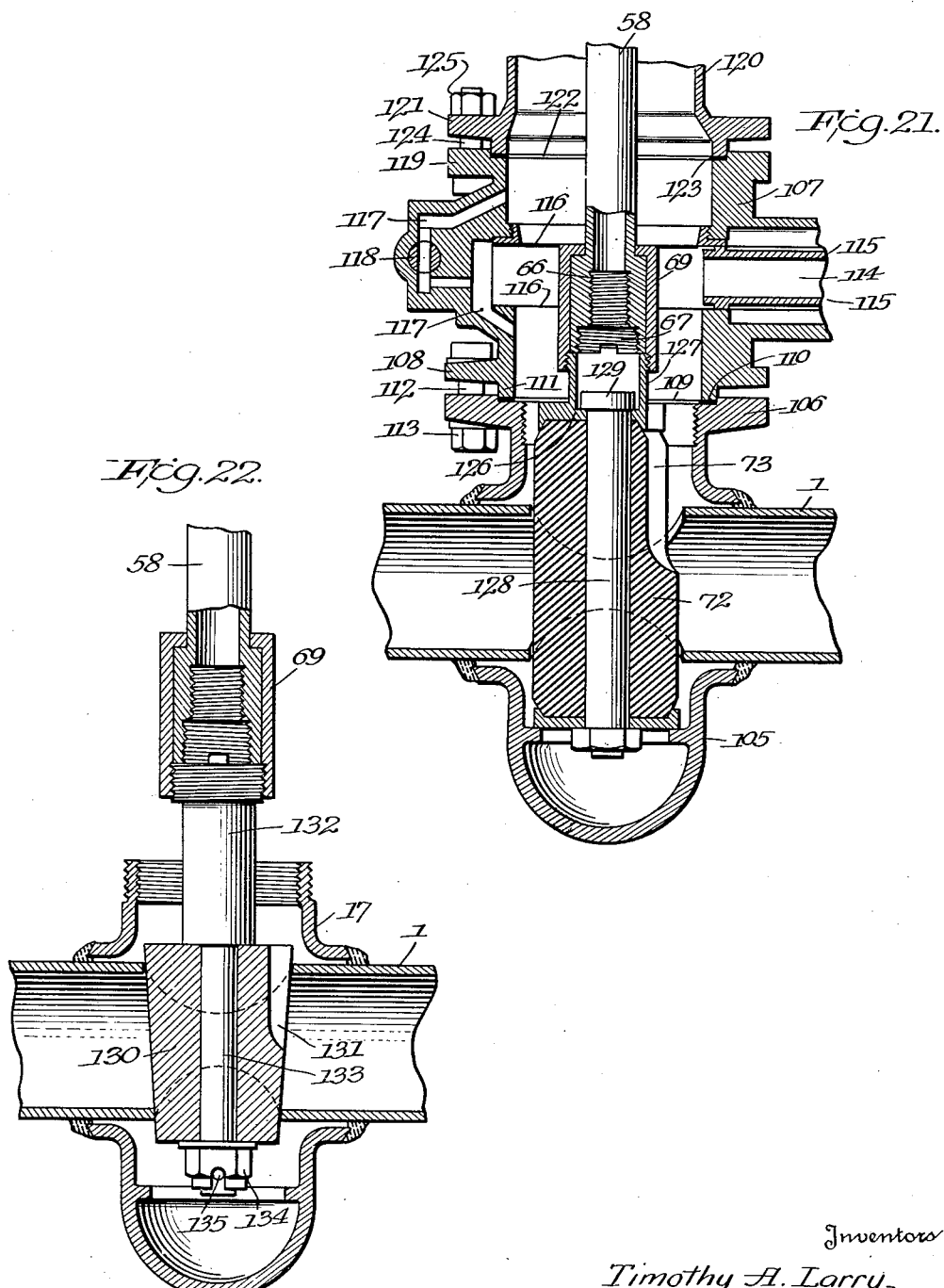

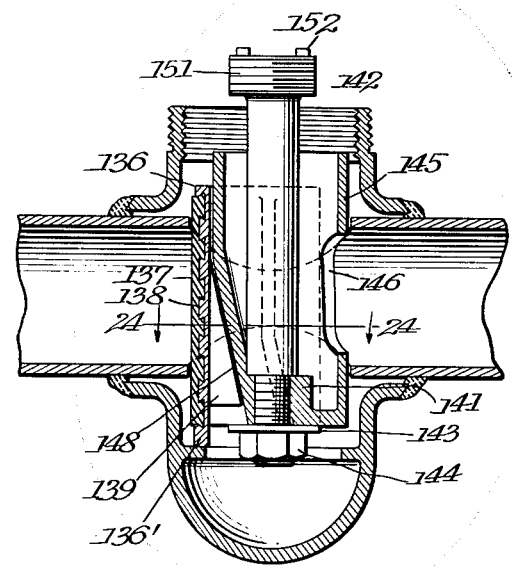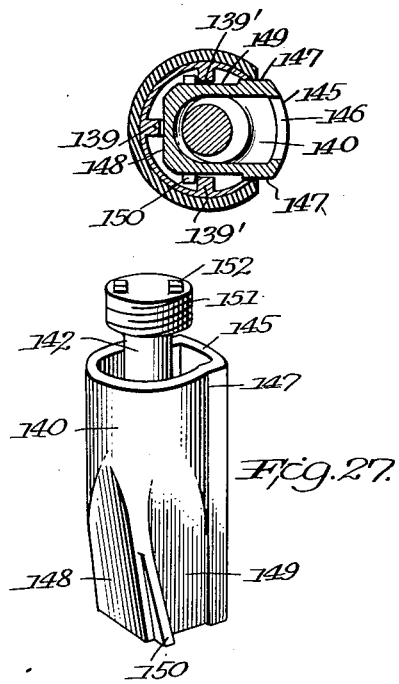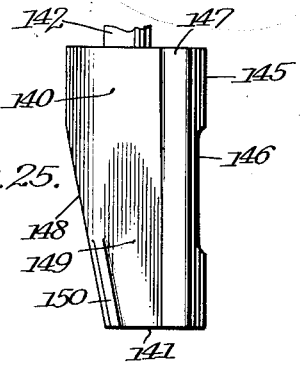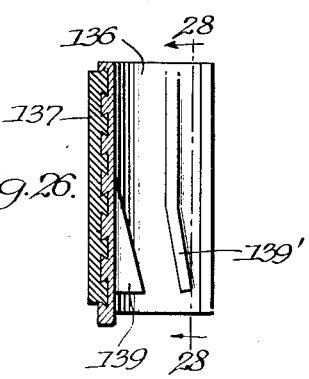

2,171,937

UNITED STATES PATENT OFFICE 2,171,937

APPARATUS FOR FLUID CONTROL

Timothy Allan Larry, Earl E. Cline, and Orville J. Hawkins, Decatur, Ill.; said Cline and said Hawkins assignors to Mueller Co., Decatur, Ill., a corporation of Illinois Application September 14, 1936, Serial No. 100,780

2 Claims. (Cl. 137—78)

This invention relates to an apparatus whereby fluid, under pressure, may be temporarily by-passed or diverted around a section of a fluid conduit, which is to be repaired, replaced, or otherwise operated upon, without substantial loss of fluid or fluid pressure and without interrupting the flow of fluid in the remainder of the conduit.

In the maintenance or extension of public service mains and branch or service pipes, such as are used to conduct gas, oil, water or other fluids, it is frequently necessary to repair, replace, or perform other operations on a section of the conduit, without interrupting service to consumers whose service pipes communicate with the conduit at points above and below the section. This necessitates the provision of a by-pass line connected to the conduit at points on either side of the section to be operated on, whereby the fluid may flow around the section, and the insertion of valve members for shutting off the flow of fluid into the section. The circuit through the by-pass line must be completed before, or simultaneously with, the shutting off of said section in order that there will be no interruption in the flow of fluid. Furthermore, the by-pass line must be connected to the conduit, the valve members inserted in the conduit and other operations performed, without permitting any appreciable escape of fluid or fluid pressure.

An object of the present invention is to provide an apparatus for connecting a by-pass line and shutting off a section of a conduit, as above described, with a minimum of labor and expense.

Another object of the invention is to provide an apparatus whereby the by-pass line may be detached, the valve members removed, and flow restored through the section of the conduit which has been repaired or replaced, without any substantial loss of fluid or fluid pressure and without interrupting the flow through the conduit above and below the section.

Other objects of the invention will be apparent from the accompanying description and drawings.

Referring to the drawings:

Figure 1 illustrates the by-passing apparatus and by-pass line applied to a pipe line, one section of which is to be removed or repaired.

Figure 2 illustrates the by-passing apparatus and by-pass lines applied to a main pipe line and a branch pipe line where the connection between the main and branch is to be repaired or removed.

Figure 3 illustrates diagrammatically the arrangement of apparatus heretofore employed to by-pass fluid around a section of a pipe.

Figure 4 is a view, partly in section, of the apparatus which is used to establish an opening in the pipe line.

Figure 5 is a side view of one form of the fitting, as it is customarily manufactured and sold, and before it is cut into two parts and welded to the pipe as shown in Figures 1 and 4.

Figure 6 is an end view of the fitting shown in Figure 5.

Figure 7 is a longitudinal sectional view of the fitting of Figure 5 after it has been cut into two parts.

Figure 8 is a transverse sectional view of the fitting of Figure 5 after it has been cut into two parts.

Figure 9 is a view, partly in section, of one of the by-passing apparatus applied to a pipe line.

Figure 10 is a transverse view, partly in section, taken on the line 10—10 of Figure 9.

Figure 11 is a horizontal section taken on the line 11—11 of Figure 10.

Figure 12 is a horizontal section taken on the line 12—12 of Figure 10.

Figure 13 is a view similar to Figure 12 illustrating the use of the same apparatus with a pipe of smaller diameter.

Figure 14 is a sectional view of the fitting, showing a closure inserted in the open end thereof, and a detail view, partly in section, of the apparatus which is used for inserting the closure.

Figure 15 is a sectional view of the fitting, showing a closure inserted in the open end thereof, and a detail view, partly in section, of the apparatus which is used for removing the closure.

Figure 16 is a bottom plan view of the closure removing apparatus shown in Figure 15.

Figure 17 is a top plan view of the closure shown in Figures 14 and 15.

Figure 18 is a sectional view of the fitting with the closure, shown in Figures 14 and 15, inserted in the open end and a cap applied over the closure.

Figure 19 is a detail sectional view of the by-passing apparatus shown in Figure 9, illustrating the relative positions generally assumed by the parts when the by-passing member is longitudinally compressed and distorted.

Figure 20 is a transverse sectional view taken on the line 20—20 of Figure 19.

Figure 21 shows a slightly modified form of the apparatus shown in Figure 9.

Figure 22 is a sectional view of a modified form of by-passing member adapted to be used with the apparatus shown in Figure 9.

Figure 23 is a sectional view of another modified form of by-passing member adapted to be used with the apparatus shown in Figure 9.

Figure 24 is a transverse sectional view taken on line 24—24 of Figure 23.

Figure 25 is a side view of the wedging device shown in Figures 23 and 24.

Figure 26 is a central vertical section through the expansible shell shown in Figures 23 and 24.

Figure 27 is a perspective view of the wedging device, and

Figure 28 is a section on the line 28—28 of Figure 26 showing the expansible shell.

Referring more particularly to the drawings, Figure 1 shows the by-passing apparatus of this invention applied to a pipe line, designated by the numeral 1, it being assumed that the pipe line is intended to convey fluid in the direction shown by the arrows and that the intermediate section 1' of the pipe line is to be removed and replaced by a new section.

One of the by-passing apparatus, generally designated by the numeral 2 and more particularly described in connection with Figure 9, is attached to the pipe line above, or on the pressure side of, the section 1', and a similar by-passing apparatus 3 is attached to the pipe below the section 1'. The by-passing apparatus 2 and 3 are connected by a by-pass line 4 and, as will appear more fully below, the fluid may be caused to flow from the upper side of the pipe line 1, through the by-pass apparatus 2, by-pass line 4 and by-passing apparatus 3, and thence into the lower side of the pipe line 1, none of the fluid being permitted to flow into the section 1' which is to be removed.

It will be apparent that consumers, who are served by the pipe line 1, and whose service connections are made at points above and below the section 1' which is to be removed, will continue to receive service while the section 1' is being removed or otherwise operated upon. It will also be apparent that it is necessary to establish only two openings in the pipe line in the installation of the apparatus.

Figure 2 illustrates the application of the apparatus to a main pipe line 5, where the section 5' which is to be removed and replaced has a service or branch pipe 6 connected thereto, the direction of flow being indicated by arrows. Under these circumstances three by-passing apparatus 7, 8 and 9, are utilized and are inter-connected by the by-pass lines 10. By-passing apparatus 7 is connected in the main pipe line 5 above the section 5' and by-passing apparatus 8 is connected in the main pipe line below the section 5'. The third by-passing apparatus 9 is connected in the service or branch pipe 6. Service may thus be continued along the main line 5 above and below the section 5' and also through the branch pipe 6, since the fluid from the pressure side of the main line will pass through the by-passing apparatus 7, through the by-pass lines 10, and thence into the main pipe line through the apparatus 8, and into the branch pipe 6 through the apparatus 9.

Figure 3 is a diagrammatic illustration of the arrangement of apparatus formerly employed for by-passing fluid around a section of a pipe line. The practice was to cut two holes in the pipe line 11, above and below the section 11', for the insertion of stoppers, stopper inserting machines being designated diagrammatically at 12 and 13, two additional holes being drilled for the establishment of ordinary branch connections 14 and 15 leading to a by-pass line 16.

The apparatus used in carrying out the herein described method of by-passing includes a fitting, generally designated by the numeral 17. As shown in Figures 5 and 6, this fitting is preferably formed as an integral casting, although it may be formed otherwise, and it is thereafter divided into two parts, as shown in Figures 7 and 8, by cutting along the two sides at 18. The fitting consists of a substantially cylindrical or tubular body 19, having an opening 20 at its upper end and closed at its lower end 21. The upper end as shown in Figures 7 and 8 is preferably threaded exteriorly at 22, for the attachment of other parts of the by-passing apparatus. The upper end is preferably also threaded interiorly as at 23, so that a threaded closure may be inserted upon removal of the by-passing apparatus, as will be hereinafter described.

The fitting is provided with aligned lateral openings 24, 25, which are adapted to receive a pipe, and the openings are bounded by the laterally extending hubs 26 and 27. The lower cylindrical portion is provided interiorly with a circumferential ledge or projection, 28, which is adapted to serve as an abutment to limit the inward or downward movement of the by-passing member which, as will be described, is inserted through the open end of the fitting.

The fittings may be made of a high grade cast steel, of a composition similar to steel pipe, thereby insuring weldability, and are manufactured in various sizes for use with the pipes of various diameters.

In the usual installation of the by-passing apparatus, as illustrated in Figure 1, a fitting is secured to the pipe at a point above, or on the pressure side of, the section around which the fluid is to be by-passed, and a second fitting is secured at a point below the section. The attachment of each fitting is preferably accomplished in the following manner. A fitting is selected, the lateral openings 24, 25 and hubs 26, 27 of which, preferably have an internal diameter appreciably or slightly larger than the external diameter of the pipe to which it is to be attached, for example, in actual practice a difference of approximately one eighth of an inch has been found suitable. The fitting is cut transversely and separated into two parts as shown in Figures 7 and 8. The upper and lower parts are brought together around the pipe and welded to each other by transverse welds 29, 29, and the fitting is then welded to the pipe by the end welds 30, 30.

It will be understood that in its final or attached positions the fitting is preferably in upright position, that is with its cylindrical body portion 19 disposed vertically and its open end 20 up, in order that the apparatus which is connected to the open end will be upright, although, of course, installation of the apparatus and practice of the method involved is not dependent on such position.

It will be understood that the pipe line is usually buried several feet below the surface of the ground, that an excavation must be made to obtain access to the pipe, and that the welding must therefore be done within the excavation.

In order that the welding may be accomplished in an expeditious manner, the two parts of the fitting are brought together around the pipe which passes through the lateral openings 24, 25, and held with the fitting in horizontal position, so that one side joint 18 will be uppermost and readily accessible for welding from above. The side joint which is uppermost is welded, at 29, and the fitting is then rotated about the pipe through approximately 180° or until the other side is uppermost. The second joint may then be conveniently welded from above. Both sides having been thus welded, the fitting is turned to upright position and rigidly secured to the pipe by welding along the edges of the laterally extending hubs 26 and 27.

By reason of the fact that the internal diameter of the lateral openings 24 and 25 and the hubs 26 and 27 is, as stated above, preferably greater than the external diameter of the pipe, the fitting may be, and preferably is, so maintained with respect to the pipe that during the above described welding operations the fitting does not contact the pipe. Maintaining the sides of the fitting out of contact with the pipe, while they are being welded, will assist in preventing an undesirable transfer of heat to the pipe, and will also insure against any attachment of the fitting to the pipe, along the side joints, which would prevent rotation of the fitting. Furthermore the provision of a space between the hubs 26, 27, and the pipe 1 insures a stronger connection at the welds 30, 30 than would be possible if the hubs contacted the pipe, the increased strength being due in part to the tendency of the molten welding metal to flow inwardly, between the hubs and the pipe, for a short distance, thus directly uniting a greater area of the pipe and hubs.

The construction, and method of attaching the fitting above described, not only enables the fitting to be manufactured and applied with great economy, but another problem, which heretofore presented serious difficulties in the use of tubular fittings, has been overcome. Reference is made to the fact that difficulty has been experienced in the use of the fitting disclosed in Patent No. 2,108,068, issued February 15, 1933, to Timothy Allan Larry, due to breaking of the shell cutters which are inserted through the upper open end of the cylindrical portion of the fitting for the purpose of drilling through the pipe within the fitting. It has been found that this is caused by carbonization and hardening of the portions of the pipe, which are within and adjacent the walls of the vertical cylindrical portion of the fitting, due to the heat used in welding the joint between the fitting and the pipe. It will be understood that, while this hardening of the metal occurred principally at the outer margin of the area of the pipe wall defined by the cylindrical portion of the fitting, the diameter of the shell cutters which are used is preferably nearly as great as the internal diameter of the cylindrical portion of the fitting, in order that substantially the entire cross section of the pipe may be cut out, and therefore the use of small shell cutters, which would cut between the zones of hardened metal, is not feasible.

The problem thus presented is solved by the present construction and method in that the fitting is welded to the pipe at a substantial distance from the portion of the pipe which is to be cut, and the zones of carbonized and hardened metal, which result from the application of the welding tool to the pipe, do not extend to the area defined by the wall of the cylindrical portion 19 of the fitting. The desirable spacing of the welds from the area, which is to be cut, is made possible in the present embodiment of the invention by the provision of the laterally extending hub portions 26 and 27. Furthermore the conduction of heat, from the points of application of the welding heat to the area within the cylindrical portion 19 of the fitting, is diminished by reason of the fact that the fitting is spaced from the pipe at all points and therefore does not act as an additional conductor of heat to the said area, as it would if it were in contact with the pipe.

A further advantage of the radially extending hubs 26, 27 resides in the added strength that they give to the assembly, which may include various pieces of apparatus connected, directly or indirectly, to the upper open end of the fitting. Such apparatus is necessarily subjected to stresses, including torques, and the hub portions greatly increase the rigidity of the structure.

After the fittings have been welded to the pipe at spaced points, above and below the section which is to be operated upon, a valve body 31 having a tapered valve seat 32 and provided with a valve, preferably a gate valve, 33 operable by a handle 34, as shown in Figure 4, is threaded on the upper end of each fitting.

An adapter sleeve 35 is threaded into the upper end of each valve body 31, as shown in Figure 4, and a device or machine 36, generally similar to pipe drilling machines of well known construction and including a feed sleeve 37, is positioned upon each adapter sleeve 35 by means of screw threaded engagement between the feed sleeve 37 and the upper end of the adapter sleeve 35. A bar 38 is slidably and rotatably mounted within the feed sleeve 37, a fluid tight joint being maintained between the two by means of conventional packing (not shown) secured upon the upper end of the feed sleeve 37 by an internally flanged collar 39. The bar 38 is provided at its upper end with an operating handle 40 having a conventional ratchet device thereon to permit the bar 38 to be rotated with a ratchet effect. A collar 41 is fixed on the upper portion of the bar 38 beneath the handle 40 and, in order that the bar 38 may be fed downwardly in the usual manner, a feed screw 42 is threaded upon the feed sleeve 37 and may be connected to the bar 38 by means of a yoke 43 pivoted upon the feed screw and having its head portion slotted as at 44 so that it may be moved into engagement with the upper surface of the collar 41 as shown in Figure 4.

The lower end of the bar 38 is provided with a central bore 45 for the reception of a pilot drill 46, which is retained therein by means of a pin 47 passing through suitable apertures in the bar and pilot drill. The lower end of the pilot drill is enlarged to provide a shoulder 46' thereon.

The lower end of the bar 38 is externally threaded for engagement with the internal threads of a shell cutter 48, and is provided with a flange 49, positioned above the screw threads, against which the upper end of the shell cutter abuts when the latter is tightly screwed on to the bar. The wall of the shell cutter is apertured as indicated at 48' in order that the flow of fluid through the pipe 1 will not be interrupted during the cutting operation.

In order to drill through the pipe 1, within the fitting 17 the bar 38 is moved downwardly, with the gate valve 33 open, until the pilot drill 46 engages the pipe. The yoke 43 is then swung into engagement with the bar 38, its slotted head portion positioned above the collar 41 of the bar, and the drilling accomplished by rotating the bar 38 by means of handle 40 and applying downward pressure by rotating the feed screw 42 to the right.

The diameter of the shell cutter 48 is preferably slightly greater than the internal diameter of the pipe 1, in order that substantially the entire cross-section of the pipe will be removed, as shown in Figures 4 and 12.

It will be understood that the pilot drill precedes the shell cutter through the pipe and acts as a guide for the shell cutter. The coupons, which are cut out of the pipe by the shell cutter, will be caught on the shoulder 46' at the lower end of the pilot drill 46 and will be removed from the fitting when the drill is withdrawn.

Owing to the fact that the drilling device is completely enclosed, no fluid will escape during the drilling operation.

When the drilling is completed the yoke 43 is disengaged from the bar 38 and the latter is then raised to withdraw the shell cutter and pilot drill into the adapter 35. The gate valve 33 is now operated to closed position and the drilling apparatus 36 is removed by unscrewing the adapter 35 from the valve body 31.

Although, as described above, a drilling apparatus may be attached to each valve body 32 and the two openings established simultaneously, it may, in some instances, be preferred to use one drilling apparatus which is attached successively to the valve bodies 31 on the respective fittings.

The next step in carrying out my method is the attachment of a by-passing apparatus, generally designated at 50 in Figure 9, to the upper end of each of the valve bodies 31, on the respective fittings.

Each by-passing apparatus includes an adapter 51, externally screw threaded at its lower end for attachment to the upper end of the valve body 31. The adapter, which may be made in various sizes, is preferably provided at its upper end with internal screw threads for the attachment of a by-passing chamber 52.

The by-passing chamber 52 is preferably substantially cylindrical and its lower end, which is open, is externally screw threaded for engagement with the internal screw threads at the upper end of the adapter 51. An annular gasket 51' is inserted between the by-passing chamber and the adapter to provide a fluid tight joint. The by-passing chamber 52 comprises the substantially cylindrical side wall 53 and a centrally apertured top wall 54. The side wall 53 is provided with an internally threaded opening 55 for the connection of a by-pass line as shown in Figures 1 and 2. The side wall of the by-passing chamber extends above the top wall 54 and the extension 56 is provided with internal threads for the attachment of a feed sleeve 57.

A bar 58 is slidably and rotatably mounted within the feed sleeve 57 and within the centrally apertured top wall 54 of the by-passing chamber, a tight joint being maintained around the lower end of the feed sleeve, by means of a conventional packing 59 located between the feed sleeve 57 and the upper wall 54 of the by-passing chamber 52.

The bar 58 is provided at its upper end with an operating handle 60. Spaced collars 61 and 62 are fixed on the upper portion of the bar 58 and in order that the bar 58 may be forced upwardly or downwardly, a feed screw 63 is threaded on the feed sleeve 57 and may be connected with the bar 58 by means of a yoke 64 pivoted upon the feed screw 63 and having its head portion slotted as at 65 so that it may be swung into engagement with the bar 58 between the collars 61 and 62, as shown in Figure 9.

The lower end of the bar 58 is provided with a socket 66 provided with left-handed internal threads, and a lower counter-bored socket 67 internally threaded with right-handed threads. The lower end of the bar 58 is slightly enlarged to provide a shoulder 68 for the retention of a sleeve 69, the upper end of which is internally flanged at 70. The sleeve 69, which is adapted to be slipped on over the top of the bar 58, during the assembly thereof and before the handle 60 and collars 61 and 62 are attached, extends below the lower extremity of the bar 58 and is provided at its lower end with internal screw threads for the attachment of the by-passing means 71.

Referring to Figures 9 and 10, the by-passing means generally designated at 71, includes a substantially cylindrical member 72, made of some resilient material such as rubber. The member 72 is partially cut away at one side as is shown at 73 and the cut-away portion preferably extends from a point approximately half way down its side upwardly and inwardly to the top of the member. Disk-like caps 74 and 75, which are preferably inwardly flanged as shown at 76 and 77, are positioned above and below the member 72. The caps 74 and 75 and the member 72 are centrally apertured for the reception of a rod 78 on which they are slidably mounted. The rod 78 is provided at its upper end with a slightly enlarged head 79 and its lower end is threaded for the reception of a nut 80 whereby the member 72 may be clamped between the upper and lower caps 74 and 75 when the nut 80 is tightened. The nut 80 is preferably provided with slots on its under surface and the rod 78 is apertured at its lower end for the reception of the usual locking pin 81.

The upper cap 74 is cut away at one side as at 82 to conform with the cut-away portion 73 of the member 72, and the flange 76 follows the contour of the cut-away portion, in order to prevent rotation of the member 72 with respect to the cap 74 after the parts are assembled. The cap 74 is provided with a central and upwardly extending cylindrical portion 83 which is externally threaded for attachment to the internally threaded sleeve 69.

When the cylindrical portion 83 of the cap 74 is threaded into the sleeve 69 it will abut the lower end of the bar 58 and it will therefore be apparent that downward pressure on the bar 58 will be directly transmitted to the cap 74. It will also be apparent that upward movement of the bar 58 will raise the cap 74 by reason of the fact that the internally flanged sleeve 69 engages the lower enlarged end of the bar 58 and also engages the upwardly extending central portion 83 of the cap 74.

The lower extremity of the bar 58, which forms the socket 68, is provided with slots 84, 84, adapted to receive lugs 85, 85, positioned on the upper surface of the cylindrical portion 83, as shown in Figure 11, whereby relative rotation of the cap 74, and consequently the member 72, with respect to the bar 58, will be prevented.

In carrying out the present method of by-passing, a by-passing apparatus such as is above described, is connected to each of the valve bodies 31 on the respective fittings 17, it being understood that in the usual installation, as shown in Figure 1, one of the fittings is located at one side of the section of the pipe which is to be removed and the other fitting is located at the other side of the section which is to be removed.

The two by-passing apparatus are then connected at the lateral openings 55 of the by-passing chambers 52, by a by-pass line shown diagrammatically at 4, in Figure 1. The by-pass line may, of course, consist of a number of sections of pipe joined together and may be of any desired length. It may also include such coupling members or elbow joints as may be convenient in any particular installation.

When the by-passing apparatus is attached to the upper end of a valve body 31 the by-passing member 72 will be withdrawn into a position within the by-passing chamber 52. This withdrawal is accomplished by disengaging the yoke 64 from the bar 58 and pulling up on the handle 60. The diameter of the member 72 is substantially less than the internal diameter of the by-passing chamber, the adapter and the valve body, so that when member 72 is in raised position it will not prevent the flow of fluid from the pipe 1 into the by-pass line.

After a by-passing apparatus 50 has been attached to each of the valve bodies 31, and the side outlets 55 of the respective by-passing apparatus connected by the by-pass line, and after all of the joints have been made tight, the valves 33 may be moved to open position.

A second flow circuit will thus be completed and the fluid in the pipe line 1, referring to Figure 1, will be free to flow through the upper open end of the fitting 17, which is located above or on the pressure side of the section 1', through the associated valve body 31, the by-passing apparatus 2, the by-pass line 4 and thence in a downward direction through the by-passing apparatus 3 which is located below or on the other side of the section 1', through the open end of the fitting to which it is secured and back into the pipe line 1. At this time the fluid may also flow directly through the section 1' which is to be removed.

The object of the procedure now to be described is to prevent the flow of fluid into the section 1' which is between the by-passing apparatus while maintaining, without interruption, the flow of fluid through the by-pass line; it being understood that the following description, while applying generally to the types of installations shown in both Figures 1 and 2, pertains particularly, for the purpose of illustration, to the installation shown in Figure 1.

By turning the handle 60 of the upper by-passing apparatus 2, the member 72 is rotated until its cut away portion 73 is aligned with the axis of the pipe 1 and faces upstream. The bar 58 is then moved downwardly, by pushing down on the handle 60, until the member 72 is in the position shown in Figure 9, the downward movement being arrested when the lower cap 76 of the member 72 contacts the inwardly projecting abutment 28 of the fitting 17.

The member 72 of the lower by-passing apparatus 3 is adjusted by turning the handle 60 until its cut away portion faces down-stream with respect to the pipe 1. It is then similarly lowered into position within its associated fitting 17, as described in connection with the by-passing apparatus 2.

It will be understood that suitable symbols may be placed on the handles 60 to indicate the direction in which the cut away portions face.

The yoke 64 of the by-passing apparatus 2 is now swung to upright position engaging the bar 58 between the collars 61 and 62, as shown in Figure 9, and the feed screw 63 is turned to the right to apply downward pressure, through the collar 62 and bars 58, to the cap 74.

The cap 75 at the lower end of the member 72 is held against downward movement by the abutments 28 of the fitting 17, and since the member 72 is made of resilient material, the downward pressure on the cap 74 will cause the member 72 to expand laterally as shown in Figures 19 and 20.

The caps 74 and 75 and the member 72 are slidable on the rod 78 and therefore the position which the rod will assume, after compression of the member 72, will not always be the same as it will depend, to some extent, upon the frictional quality of the resilient material of which the member 72 is made. Figures 19 and 20 illustrate one position which the rod 78 may assume and it will be noted that the cap 74 has moved downwardly a considerable distance from the head 79 of the rod 78, with the result that the head 79 is positioned within the socket 66. In view of this possible range of movement, the apparatus is preferably so designed that the diameter of the head 79 will be smaller than the internal diameter of the socket 66. It will also be noted that the fitting 17 should be of sufficient depth to allow for a considerable downward movement of the rod 78.

Upon expansion of the member 72 of the by-passing apparatus 2, it will be forced into contact with the adjacent walls of the pipe 1, as shown in Figures 19 and 20, and act as a valve to close off, at its upper end, the section 1' of the pipe, which is below or downstream with respect to the member 72. Fluid may continue to flow from the portion of the pipe 1 above the fitting, by reason of the provision of the cut away portion 73 in the member 72 which permits flow of fluid from the pipe 1 upwardly through the opening 20 into the by-passing apparatus 2.

The member 72 of the by-passing apparatus 3, having been adjusted as above described so that the cut away portion 73 faces down-stream, it is now compressed in the same manner as described in connection with the by-passing apparatus 2. As a result, fluid coming from the by-passing apparatus 3 will flow down into the opening 20 of the fitting 17, through the cut away portion 73 and into the pipe 1 below the by-passing apparatus 3, and the by-passing member 72, which is expanded into fluid tight engagement with the walls of the pipe, on the upper side of the fitting 17, will act as a valve to prevent the flow of fluid into the pipe section 1' adjacent the by-passing apparatus 3.

After the operations on the section 1' are completed and it is desired to restore flow through the section and to remove the by-passing apparatus, this may be accomplished expeditiously and without loss of fluid pressure by the use of the apparatus and method to be hereinafter described.

The first step in the method of removing the by-passing apparatus consists in turning the feed screw 63, of the by-passing apparatus 2, to the left to relieve the downward pressure on the by-passing member 72. This will result in a lateral contraction of the by-passing member, owing to the resiliency of the material of which it is made, and, the fluid will flow through the spaces thus created between the by-passing member and the adjacent walls of the pipe, and into the pipe section 1'.

The yoke 64 may then be disengaged from the bar 58, of the by-passing apparatus 2, and the member 72 is drawn up into the chamber 52 by pulling up on the handle 60. Although this procedure may be carried out without difficulty in most instances, because of the tendency of the member 72 to assume its normal cylindrical shape and thus equalize the pressure in the portions of the pipe on either side of the member, it has been found that, in some cases, where the pressure is exceedingly high, the member 72 may be forced into such tight engagement with a portion of the pipe that the resiliency of the by-passing member will not be sufficient to bring about the above mentioned contraction. In such cases, equalization of pressures is preferably effected by rotating the handle 60 of the bar 58 through an angle of approximately 45°, with the result that the cut away portion 73 of the member 72 will face in a direction at right angles to the axis of the pipe 1. A passageway for the fluid will thus be created between the sections of the pipe on either side of the member 72, through the cut away portion 73, and pressure having thus been equalized, the member 72 may be removed without difficulty by disengaging the yoke 64 and pulling up on the handle 60.

It will be understood that after one of the by-passing members 72 has been removed, pressure will be equalized at the other by-passing member and no difficulty will be experienced in removing the latter.

After the by-passing members 72 have been withdrawn into the respective chambers 52 of the by-passing apparatus 2 and 3, the gate valves 33 are closed, thus preventing further flow of fluid into the by-passing apparatus. The by-pass line 4 may then be removed and the by-passing chambers 52 may be unscrewed and removed from the adapters 51.

Since in most cases, it will not be convenient or economical to utilize the valve bodies 31 and valves 33 as closures for the open ends of the fittings 17 for an indefinite period of time, the present invention contemplates methods and apparatus for applying and removing an inexpensive closure at the opening 20, without substantial loss of fluid or fluid pressure.

In carrying out the method of applying the closure certain parts of the by-passing apparatus described above, and shown in Figure 9, including the chamber 52 and bar 58 are utilized, together with the valve body 31, valve 33, and a closure applying tool which is to be described below. It will be understood that similar apparatus and procedure may be employed in the application of the closure to each fitting and it will therefore be sufficient to describe the application of one closure.

After the by-pass line has been disconnected from the chamber 52, as above described, the opening 55 in the chamber 52 is sealed, preferably by threading a conventional plug 86 therein, as shown in Figure 9. The by-passing member 72 is detached from the bar 58 by unscrewing the sleeve 69 from the cap 74 and the closure applying tool may now be attached to the lower end of the bar 58 as will be described hereinafter.

Referring to Figure 14, the closure preferably comprises a plug like member 87 having external right hand threads adapted to engage the internal threads 23 of the fitting opening 20. An internally threaded central bore 88, of appreciably less depth than the thickness of the plug, is provided for the reception of the closure inserting tool.

The closure 87 is also provided on its upper surface with a slot 89 (Figure 17) which intersects the bore 88 for the reception of the closure removing tool.

The closure applying tool, shown in Figure 14, comprises a cylindrical member 90 having right hand threads at its upper end, which are adapted to engage the internal threads of the counter-bored socket 67 at the lower end of the bar 58. The member 90 may be enlarged at a point below its threaded upper end as shown at 91 for the purpose of limiting the movement of the member 90 into the socket 67. The lower end of the member 90 is somewhat reduced in size and provided with right hand threads, which are adapted to engage the internal threads of the bore 88 in the closure 87.

The method of inserting the closure comprises attaching the above described closure applying tool to a closure 87 by screwing the lower end of the tool into the bore 88 of the closure 87 and also screwing the upper end of the tool into the socket 67 at the lower end of the bar 58. Chamber 52 is then screwed into the adapter 51, the opening 55 having first been sealed by the insertion of the plug 86, and the bar 58 with the closure attached thereto, having been raised to its uppermost position. The gate valve 33 is then withdrawn and the closure positioned in the opening 20 of the fitting 17 by lowering the bar 58. The handle 60 of the bar 58 is then rotated to the right to screw the closure tightly into the opening 20. After the closure has been tightened, the inserting tool may be removed from the closure 87 by turning the rod 58 to the left and unscrewing the member 90 from the closure. The closure 87 will not be disengaged from the fitting and the member 90 will not be disengaged from the socket 67, when the bar 58 is rotated to the left, by reason of the fact that the diameter of the lower threaded end of the member 90 is considerably less than the diameter of either the closure 87 or the upper threaded end of the member 90. Since the lower threaded end of the member 90 thus presents the smallest threaded area, and the friction tending to prevent its disengagement will therefore be less than the friction at the other connections, the lower end of the member 90 will be the first to become loosened.

The opening 20 having been thus sealed, without any substantial loss of fluid or fluid pressure, by the insertion of the plug 87, and the inserting tool having been removed, the valve body 31, together with the adapter 51 and by-passing chamber 52, may be removed from the open end of the fitting. If desired a cap 92 (Figure 18), internally threaded for engagement with the external threads 22 of the fitting, may then be screwed onto the upper end of the fitting over the closure 87.

In the event that it is desired to reopen the fitting for again by-passing fluid, or for any other purpose, without substantial loss of fluid or fluid pressure, the apparatus and method next to be described is preferably employed. The apparatus includes a closure removing tool shown in Figure 15 and generally designated at 93. It will be understood that similar apparatus and procedure may be employed in the removal of the closure from each fitting and it will therefore be sufficient to describe the removal of one closure.

The closure removing tool 93 comprises a cylindrical member 94 having a reduced central extension 95 provided with left-hand threads which are adapted to engage the left-hand internal threads of the socket 66 at the lower end of the bar 58. The cylindrical member 94 is also provided with reduced central extension 96 having right-handed threads thereon. One side of the extension 96 is flattened as at 97 and, as shown in Figure 15, the extension 96 is preferably of slightly larger diameter than the extension 95. A pin 98 extends laterally from the flattened side of the portion 96, its purpose being to limit the outward movement of an apertured disc-like member 99 slidably positioned on the portion 96. A nut 100, threaded on the portion 96, limits the upward movement of the member 99 and serves to move it outward when rotated to the right. The member 99, shown in bottom plan view in Figure 16, is centrally apertured at 101, the aperture being non-circular and of approximately the same shape as the cross-section of the member 96, whereby the member 99 may be slidably, but non-rotatably mounted, on the member 96.

The member 99 is provided on its outer surface with aligned outstanding lugs 102 having outward extensions 103 at their inner extremities for engagement in the slot 89 of the closure 87.

The extension 96 is provided at its outer end with a reduced threaded portion 104 adapted to be screwed into the internally threaded bore 88 of the closure 87.

In carrying out the method of removing the closure 87 from the fitting 17, the closure removing tool 93 is attached to the closure 87 by screwing the threaded portion 104 into the bore 88 of the closure. In so doing the nut 100 is first screwed up on the threaded member 96 to permit the member 99 to be raised. The member 99 is held in raised position until the extension 104 is screwed in to the bore 88, after which the member 99 is lowered and the valve removing tool rotated until the extensions 103 of the lugs 102 are so positioned that they will enter the slot 89 of the closure. The nut 100 is then rotated to the right to force the member 99 down and maintain the extension 103 of the lugs 102 in engagement within the slot 89. It will be thus seen that the closure removing tool 93 is now securely attached to the closure 87 and upon rotating the tool to the left, the closure 87 may be unscrewed by reason of the engagement of the lug extensions 103 in the slots 89 and the fact that the member 99 is not rotatable with respect to the member 96.

In order that the closure 87 may be removed without substantial loss of fluid or fluid pressure, the apparatus described above, including the valve body 31, adapter 51, chamber 52 and bar 58, is assembled as in Figure 9, the opening 55 in the chamber 52 being sealed by a plug 86 if a by-pass circuit is not previously established, and the valve body 31, with its associated apparatus, being screwed onto the open end of the fitting 17. The gate valve 33 is withdrawn and the bar 58 is then lowered to engage the closure removing tool 93, which has been previously attached to the closure 87 as above described. Upon rotating the bar 58 to the left, the threaded extension 95 will screw into the socket 66 until the cylindrical portion 94 engages the lower end of the bar 58. Upon further rotation of the bar 58 to the left, the valve removing tool 93 will be turned and the closure 87 will be unscrewed from the open end of the fitting.

The closure removing tool, with the closure secured thereto, may now be raised by pulling up on the handle 60 of the bar 58 and the gate valve 33 is then operated to closed position. The chamber 52 may then be detached from the adapter 51 and the closure removing tool unscrewed from the bar 58. It will be apparent that the closure 87 has been removed without substantial loss of fluid or fluid pressure, and it will be understood that a by-passing member 72, such as is shown in Figure 9, may now be conveniently inserted in accordance with the method hereinbefore described.

The foregoing description of the method and apparatus for by-passing fluids, while referring particularly to the installation illustrated in Figure 1, is also applicable to the installation illustrated in Figure 2, where a main pipe line 5 has a branch pipe 6 connected thereto and the section 5′, which is to be operated upon, includes the branch connection. Under such circumstances an opening is preferably established in the branch line and a third by-passing apparatus attached at the opening. The third by-passing apparatus is connected with the by-pass line which carries the fluid between the two by-passing apparatus on the main line. The cut away portion of the by-passing member 72 in the third by-passing apparatus is so disposed that it faces away from the main line and down the branch line. The by-passing apparatus is installed and operated in this branch line in substantially the same manner as was described in connection with Figure 1 and the flow of fluid in the branch line will not be interrupted during the operation on the branch connection.

The openings which are established in the main or branch pipes have been described as having a diameter preferably slightly larger than the internal diameter of the pipe. (Figures 4 and 12.) In some cases, and particularly where the pipe to be operated upon is of unusually small diameter, the diameter of the shell cutter may be substantially greater than the external diameter of the pipe with the result that the entire cross section of the pipe is removed as shown in Figure 13. In this case the by-passing member expands against the opposed end walls of what may be regarded as two pipes and satisfactory results are obtained.

There is shown in Figure 21, a modified form of fitting, gate valve and adapter. In this modification, the fitting 105 is provided at its upper open end with an apertured flange 106 and the valve body 107 is provided at its lower end with an apertured flange 108. The upper opening of the fitting is preferably provided with an annular recess or rabbit 109 for the reception of a gasket 110 and the lower end 111 of the valve body, which extends below the flange 108, may be positioned within the annular recess and seat on the gasket 110. Suitable bolts 112 pass through the apertures of the flanges 106 and 108 and are provided with nuts 113, whereby the valve body may be securely attached to the open end of the fitting in a liquid-tight manner. The gate valve 114, having parallel faces 115, may be projected into the valve body in the usual manner to seat against the valve seats 116. In this modification the valve body is provided with a conventional means for equalizing pressure on both sides of the gate valve, including a conduit 117 and a normally closed valve 118. The pressure equalization means is useful where the pressure of the fluid against the lower surface of the gate valve 114 may urge the valve against its seat 116 with such force as to render it difficult to withdraw the valve. When this occurs, the pressure on each side of the gate valve may be equalized by opening the valve 118 and permitting the fluid to flow through the conduit 117 from the lower to the upper side of the gate valve.

The valve body 107 (Figure 21) is provided at its upper end with an apertured flange 119 and the lower end of the adapter 120 is provided with an apertured flange 121. An annular recess or rabbit 122 is preferably provided at the upper end of the valve body for the reception of a gasket 123 and the lower end of the adapter 120 extending below the flange 121 is adapted to be positioned within the recess 122 seating on the gasket 123. Bolts 124 pass through the apertures of the flanges 119 and 121 and are provided with nuts 125, whereby the adapter 120 may be bolted to the valve body 107 in liquid-tight manner.

The by-passing member 72, shown in Figure 21, is provided at its upper end with a modified form of cap 126 wherein the extension 127, which is adapted to be screwed within the sleeve 69 on the bar 58, is a hollow cylinder. The rod 128 extending longitudinally through the by-passing member 72, is provided at its upper end with a head 129, which fits within the hollow cylindrical extension 127 of the cap 126, and the lower surface of the head 129 engages the cap 126. It will be observed that in this modification it is not necessary that the head 129 be of smaller diameter than the socket 66 of the bar 58, as was the case in the embodiment shown in Figure 9, since the area which is within the counterbore 67 and the cylindrical extension 127, is sufficient to permit movement of the head 129 in an upward direction when the bar 58 is moved downwardly to compress the member 72.

A modified form of by-passing member 130 is shown in Figure 22 and may be substituted for the by-passing member 72 in the apparatus heretofore described. The by-passing member 130 is preferably substantially frustro-conical in shape and is provided on one side with a cut away portion 131 to permit the flow of fluid from the upper side of the pipe line upward and outward through the open end of the fitting 17. It will be understood that a valve body 31, and adapter 51 and by-passing chamber 52 will be connected at the open end of the fitting as shown in Figure 9. In the use of this type of by-passing member, two shell cutters are used successively, with the apparatus shown in Figure 4, to cut through the pipe 1, the first shell cutter being of slightly smaller diameter than the second. The first shell cutter is used to drill all the way through the pipe 1 and the second shell cutter is used to enlarge the opening in the upper surface of the pipe. Suitable reamers may then be employed to impart an angularity to the edges of the openings which corresponds substantially to the shape of the by-passing member 130.

The by-passing member 130 may be made of some resilient or yieldable metal, as for example copper, bronze or brass, or may be made of rubber, and is secured to the sleeve 69 on the bar 58 by means of a member 132 having its upper end threaded for engagment with the internal threads on the sleeve 69 and having, it its lower end, a reduced central extension 133 which passes through a central longitudinal bore in the member 130. The lower end of the reduced extension 133 is provided with threads for the reception of a nut 134 which is adapted to urge the by-passing member 130 against the member 132. A conventional pin 135 is used to lock the nut 134 on the extension 133.

The by-passing member 130, having been connected to the end of the bar 58, is inserted within the opening in the pipe by the same method as was described in connection with the by-passing member 72 (Figure 9) and it will be seen that when downward pressure is applied to the bar 58 by rotation of the feed screw 63, the by-passing member 130 will be wedged tightly in the upper and lower openings in the pipe 1. The openings are of such size that substantially the entire cross section of the pipe is removed and the by-passing member 130 will therefore prevent any passage of fluid into the downward side of the pipe 1.

Another modified form of by-passing member is shown in Figures 23 to 28 and may be used in carrying out the method of by-passing hereinbefore described. This by-passing member consists of a metallic shell 136 which is adapted to be positioned within an opening, established in the pipe line 1, and is curved to conform to the shape of the opening. The metallic shell 136 is preferably provided on its outer surface with a layer of rubber 137 secured thereto in any suitable manner, as for example by dove-tail joints 138. The shell 136 is open at the top and bottom and along one side and may be positioned within the opening established in the pipe with the shell closing off one section of the pipe and the opening in the side of the shell so disposed with relation to the other section of the pipe as to permit fluid to pass interiorly of the shell and upwardly through the open end of the fitting 17.

In order that the shell 136 may be expanded into sealing engagement with the walls of the pipe 1, a plurality of wedge-shaped members 139, 139' are provided on the interior, merging with the upper interior surface of the shell and extending downwardly and away from the interior surface. A hollow wedging device 140 is adapted to be moved downwardly to slidably engage the wedge members 139, 139' on the interior surface of the shell and also engage the section of the pipe opposite to that which is to be closed off. The shell 136 may be provided at its lower end with an integral projection 136' which is adapted to rest on the abutment 28 of the fitting 17 to limit the downward movement of the shell although it will be understood that the projection 136' may be omitted, in which case the lower edge of the shell will rest on the abutment 28.

The wedging device 140 includes a base 141 having an internally threaded vertical bore into which a rod 142, having a threaded lower end, may be screwed. The threaded lower end of the rod 142 extends through and beyond the base 141 for a sufficient distance to enable a washer 143 and nut 144 to be secured thereon. After threading the rod 142 through the base 141, it is preferably secured against rotation therein by a pin (not shown) extending through the base and the rod. A wall 145 extends vertically upward from the base 141, and forms one side of the hollow wedging device 140. The wall 145 is somewhat curved in cross section (Figure 24) to conform to the shape of the opening in the pipe 1 and is provided intermediate its top and bottom with an aperture 146 through which fluid may flow into the hollow wedging device when the wall 145 is positioned, as shown in Figure 23, with the aperture 146, facing toward the pressure side of the main 1. Substantially flat and parallel walls 147 extend inwardly from wall 145 for a relatively short distance and fit loosely within the side opening of the shell 136, the vertical edges of the shell 136 thus guiding the vertical movement of the wedging device 140.

At the upper end of the wedging device 140, the side walls 147 bend outwardly and then inwardly and circularly to meet and form the upper portion of the hollow wedging device. The curvature of the upper portion of the hollow wedging device conforms substantially to the curvature of the interior surface of the shell 136, the later enveloping the former, whereby the upper end of the shell is slidably retained by the upper end of the wedging device.

The side of the wedging device 140, which is opposite the wall 145, and which is curved at its upper end to substantially conform to the curvature of the interior surface of the valve member 136, is flattened at a point preferably approximately one-quarter of the distance down its side, and the flattened portion, shown at 148, inclines downwardly and inwardly to the lower edge of the base 141 and substantially to the rod 142.

The portions 149 of the wedging device 140, which extend between the parallel walls 147 and the side opposite the wall 145, are similarly flattened and are inclined downwardly and inwardly toward the lower edge of the base 141.

The portions 149 are provided with ribs 150, which extend from the lower edge of the base 141, parallel to the edge of the flattened and tapering portion 148, for a distance preferably approximately one-third of the length of the wedging device 140.

When the device is assembled, the ribs 150 are positioned adjacent to and inwardly of the wedge members 139' and the lower end of the wedging device will thus slidably retain the shell 136. It is to be noted that the wedge members 139' are inclined at their lower ends to conform substantially with the inclination of the ribs 150, in order to permit the shell to move away from the wedging device.

The upper end of the rod 142 is provided with an enlarged threaded head 151 having lugs 152 on its upper surface and the by-passing member may be connected to the bar 58 of the apparatus shown in Figure 9 by threading the sleeve 67 over the head 151. The apparatus which is used for inserting and expanding the by-pass member 72, may thus be used to insert and expand the by-passing member shown in Figure 23.

The by-passing member shown in Figure 23 is inserted by the same method as is the by-passing member 72, shown in Figure 9, and the handle 60 of the bar 58 is rotated to so position the by-passing member that the aperture 146 faces in the desired direction, rotation of the by-passing member with respect to the bar 58 being prevented by the engagement of the lugs 152 in the slots 84 (Figure 11). Downward pressure is then applied to the wedging device 140 by turning the feed screw 63 to the right.

It will be seen that when the wedging device 140 moves downwardly, a wedging action takes place between the wedge member 139 and the inclined walls 148 and between the wedge members 139' and the inclined walls 149. Since downward movement of the shell 136 is prevented by the abutment 28, the shell 136 is expanded into sealing engagement with the adjacent pipe walls, and the vertical wall 145 of the wedging device is forced against the section of the pipe on the pressure side of the fitting. Flow of fluid into the section of the pipe immediately below the by-passing member is thus prevented and a tight seal effected, while the fluid from the upper or pressure section of the main will flow through the aperture 146 and upward through the open end of the wedging device 140 and the open end of the fitting 17.

Since the above apparatus and methods may be modified without departing from the scope of the invention, it is intended that all matter contained in the above description or shown in the accompanying drawings shall be regarded as merely illustrative.

The fitting which is shown herein and the method of attaching the same to a pipe, form the subject matter of copending applications of Timothy Allan Larry and Earl E. Cline, Serial No. 100,782, filed September 14, 1936, Serial No. 122,248, filed January 25, 1937, and Serial No. 122,249, filed January 25, 1937.

Other aspects of the invention shown but not claimed herein are claimed in our copending application Serial No. 128,284, filed February 27, 1937, which is a division of the present application and the copending application of Earl E. Cline, Serial No. 291,233, filed, Aug. 21, 1939.

We claim:

1. An apparatus for use in by-passing fluid around a section of a pipe line comprising fittings adapted to enclose the pipe at either side of said section, each of said fittings having an open cylindrical portion extending outwardly from the pipe so that openings may be made in the pipe and within the fittings, members insertable through the open cylindrical portion of the fitting and into the pipe and adapted to prevent flow of fluid into said section and to permit flow of fluid between the open cylindrical portions of the fitting and the remainder of the pipe, and a conduit adapted to connect the respective open cylindrical portions of the fittings.

2. An apparatus for use in by-passing fluid around a section of a pipe line comprising fittings adapted to enclose the pipe at either side of said section, each of said fittings having an open cylindrical portion extending outwardly from the pipe so that openings may be made in the pipe and within the fittings, expansible members insertable through the open cylindrical portion of the fittings and into the pipe and adapted to be expanded to prevent flow of fluid into said section and having passageways therein to permit flow of fluid between the open cylindrical portions of the fitting and the remainder of the pipe, and a conduit adapted to connect the respective open cylindrical portions of the fittings.

TIMOTHY ALLAN LARRY.
EARL E. CLINE.
ORVILLE J. HAWKINS.